United States Patent
Ringrose

(10) Patent No.: US 6,450,558 B1
(45) Date of Patent: Sep. 17, 2002

(54) SNAP-HOOK DEVICE FOR ATTACHMENT TO AN OBJECT SUCH AS A RING OR MOORING BUOY, AND RELEASE THEREOF, PARTICULARLY FOR BOATS

(75) Inventor: Anthony Stephen Ringrose, Geneva (CH)

(73) Assignee: C. Sherman Johnson Company, Inc., East Haddam, CT (US)

(*) Notice: Subject to any disclaimer, the term of this patent is extended or adjusted under 35 U.S.C. 154(b) by 0 days.

(21) Appl. No.: 09/889,474

(22) PCT Filed: Nov. 15, 2000

(86) PCT No.: PCT/CH00/00611

§ 371 (c)(1),
(2), (4) Date: Oct. 1, 2001

(87) PCT Pub. No.: WO01/36830

PCT Pub. Date: May 25, 2001

(30) Foreign Application Priority Data

Nov. 19, 1999 (EP) ................................. 9981106

(51) Int. Cl.$^7$ ............................. B66C 1/36; F16B 45/02
(52) U.S. Cl. .................. 294/82.2; 294/82.33; 24/600.1
(58) Field of Search .......................... 294/82.19, 82.2, 294/82.24, 82.27, 82.31, 82.33, 19.1; 24/599.1, 59.4, 599.6–599.9, 600.1; 144/230.3

(56) References Cited

U.S. PATENT DOCUMENTS

| | | | |
|---|---|---|---|
| 653,021 A | | 7/1900 | Hamilton |
| 1,532,927 A | * | 4/1925 | Nowland .................... 24/599.5 |
| 1,576,352 A | * | 3/1926 | Nordling .................... 24/599.8 |
| 3,918,758 A | | 11/1975 | Fournier |
| 4,093,293 A | * | 6/1978 | Huggett ....................... 114/113 |
| 4,440,432 A | * | 4/1984 | Goris ......................... 24/599.8 |
| 4,595,223 A | | 6/1986 | Hawie |
| 5,538,303 A | | 7/1996 | Dunham |

FOREIGN PATENT DOCUMENTS

| | | |
|---|---|---|
| DE | 698825 | 11/1940 |
| EP | 0 354 327 A1 | 2/1990 |
| EP | 0 400 702 A1 | 12/1990 |
| EP | 0 644 340 A2 | 3/1995 |
| GB | 920392 * | 3/1963 |
| WO | WO 92/02406 | 2/1992 |
| WO | WO 94/244458 | 10/1994 |

* cited by examiner

Primary Examiner—Dean J. Kramer
(74) Attorney, Agent, or Firm—McCormick, Paulding & Huber LLP

(57) ABSTRACT

A snap-hook device comprises a hook closed by a latch held against a stop by a spring. The latch consists of two parts, a lever and a bridge-piece hinged in relation to one another on an axis. Another stop prevents them from pivoting in relation to one another and a spring exerts torque between these two parts of the latch. The snap-hook is opened for hooking-on by the rotation of the latch towards the inside of the hook, against the force of the spring, and opened for release by the rotation of the lever of the latch towards the exterior of the hook, against the force of the spring.

13 Claims, 4 Drawing Sheets

SNAP-HOOK DEVICE FOR ATTACHMENT TO AN OBJECT SUCH AS A RING OR MOORING BUOY, AND RELEASE THEREOF, PARTICULARLY FOR BOATS

BACKGROUND OF THE INVENTION

1. Technical Field.

The present invention applies to a device that can attach to and release an object such as a ring in general, and to devices that can attach to and release such objects as they may be found in a marine application in particular.

2. Background Information.

The problem of hooking onto an attachment point from a distance is encountered in mountain-climbing, speleologie and above all in the mooring of boats (this list is in no way exhaustive). The idea of automatically hooking onto a ring or buoy by means of a snap-hook, where the latch of the snap-hook is held in the closed position by a spring, has existed for a long time. However, the problem of re-opening the snap-hook and releasing it from the ring has only been partially resolved.

The U.S. Pat. No. 653,021 describes a snap-hook where the opening of a latch can be operated from a distance. However, with this device the force exerted by the boat on the mooring ring is transmitted via the mechanism of the latch. Thus, all parts of the device, including the closing mechanism of the latch, must be built to resist this force which may amount to several hundred Newtons. Consequently, the device is massive, heavy and expensive to manufacture. In addition, depending on the sea-state, the jerking and tugging caused by waves and wind will constantly activate the opening mechanism, causing it to wear out prematurely.

U.S. Pat. No. 4,595,223 proposes a snap-hook where the opening of the latch can be effected from a distance by means of a long tool specifically intended for this use. However, it should be borne in mind that when releasing the mooring, depending on the sea-state and the wind strength, a force of several hundred Newtons may be exerted on the hook, so that even if the latch is opened from a distance, the hook still has to be detached from the mooring ring. In effect, due to the traction exerted by the boat on the hook, the boat will still be attached to the mooring ring even if the latch is open.

More recently other devices have been proposed where the hook consists of two main parts, one of which (typically the part which holds onto the mooring buoy) pivots around an axis. A mobile element locks the two parts of the hook together. To release the mooring, the mobile element is activated by pulling on the control mechanism by means of a rope or a boat-hook, so as to allow the part of the hook attached to the buoy to pivot freely around its axis. European patent application EP 0644340A3 discloses an example of this type of device. The main inconvenience with such a device is its lack of security: there is always the possibility of involuntary release of the mooring due to an accidental pivoting of the part of the hook attaching the boat to the buoy. This could result from a faulty maneuver, or from breakage or dysfunction of one components of the hook's mechanism, which could have serious consequences. In addition, these relatively complex mechanisms are expensive to manufacture. It should also be taken into account that, because of the lack of security, these devices are only intended for a temporary, attentively surveyed mooring at the moment of arrival or departure.

It is evident that the ideal device for attaching and releasing a boat has not yet been invented. Ideally, such a device would be simple, robust and reliable, and would also be suitable for semi-permanent, non-surveyed mooring of the vessel.

DISCLOSURE OF THE INVENTION

The aim of the present invention is to provide a means for overcoming the above-mentioned shortcomings. To this end, the present invention proposes a snap-hook device having a closed clasp that includes a hook to which a latch is hinged about an axis perpendicular to the plane of the clasp, a stop to limit the pivoting movement of the latch in the closed position of the clasp, and an elastic means of exerting a torque between the latch and the hook in order to hold the latch against the stop. The latch includes two parts both hinged around an axis perpendicular to the plane of the clasp, at least one stop to limit the rotational movement of the parts in relation to one another, and a second elastic means to maintain a torque between the two parts of the latch in a direction opposite to that of the torque exerted between the latch and the hook and tending to continuously hold the parts against the stop.

These and other objects, features, and advantages of the present invention will become apparent in light of the detailed description of the present invention.

BRIEF DESCRIPTION OF THE DRAWINGS

The attached drawings schematically illustrate typical examples of one embodiment of such a device.

DETAILED DESCRIPTION OF THE INVENTION

Figure 1:
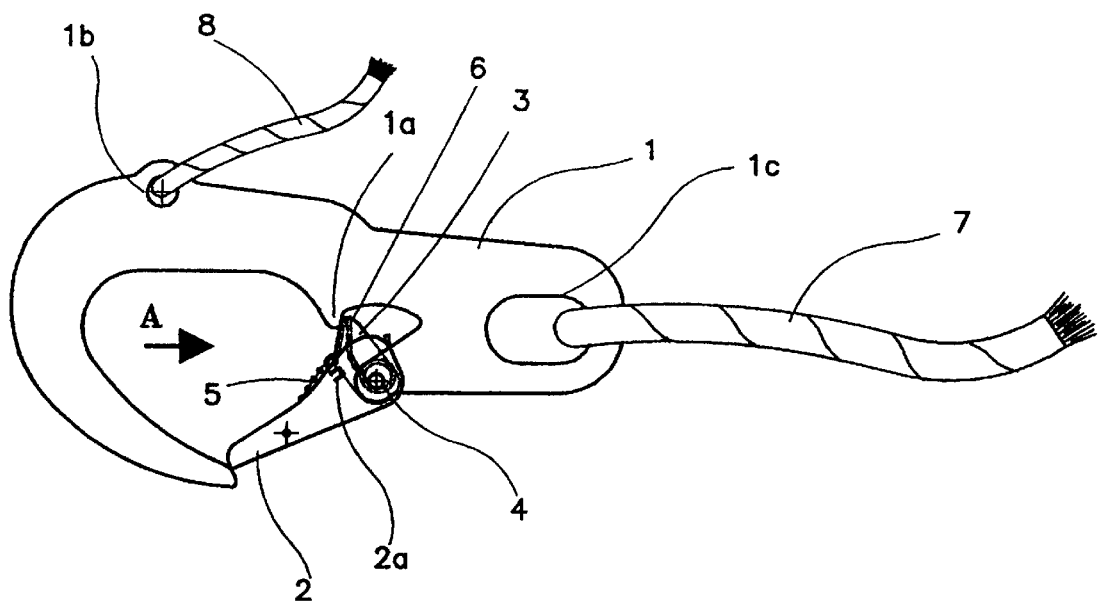
FIG. 1 is a general view of this concept.
Figure 2:
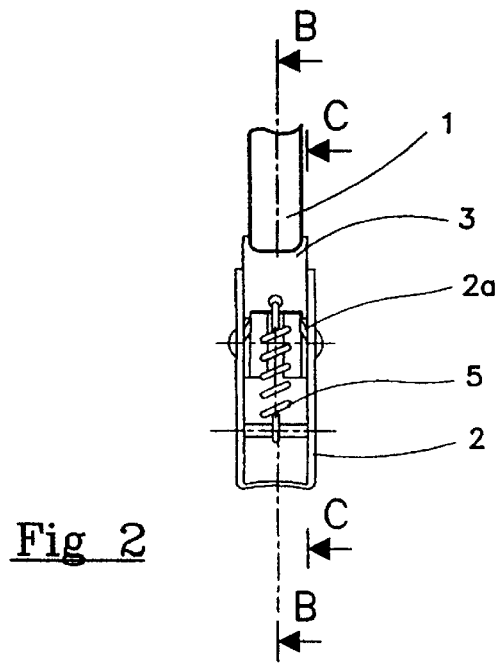
FIG. 2 shows a view in the direction of arrow A of FIG. 1.
Figure 3:
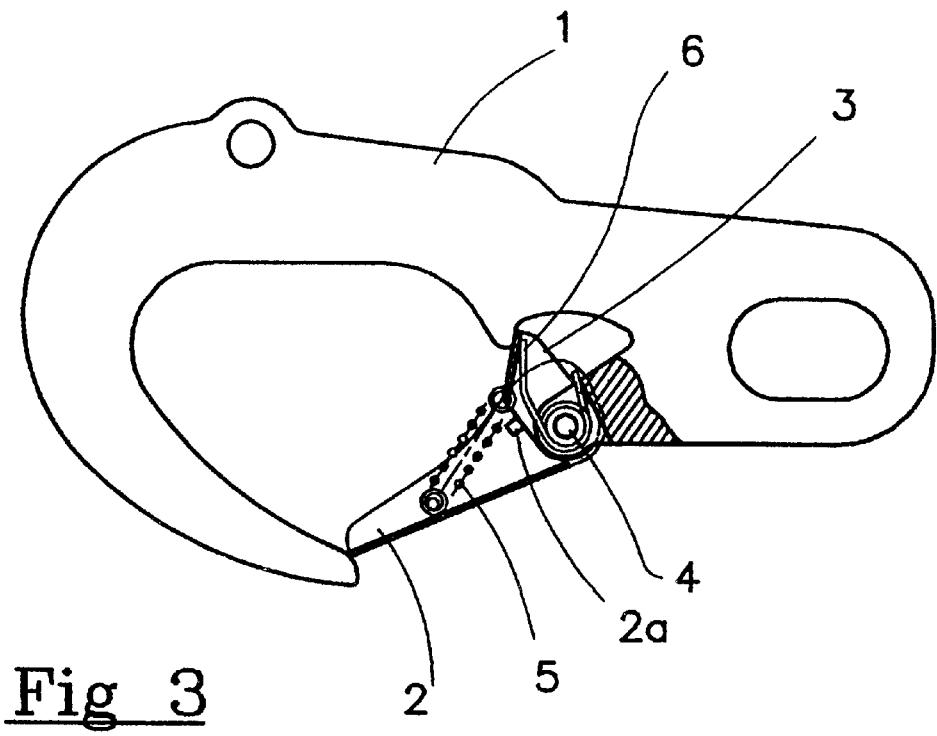
FIG. 3 is a section view B—B of FIG. 2.
Figure 4:
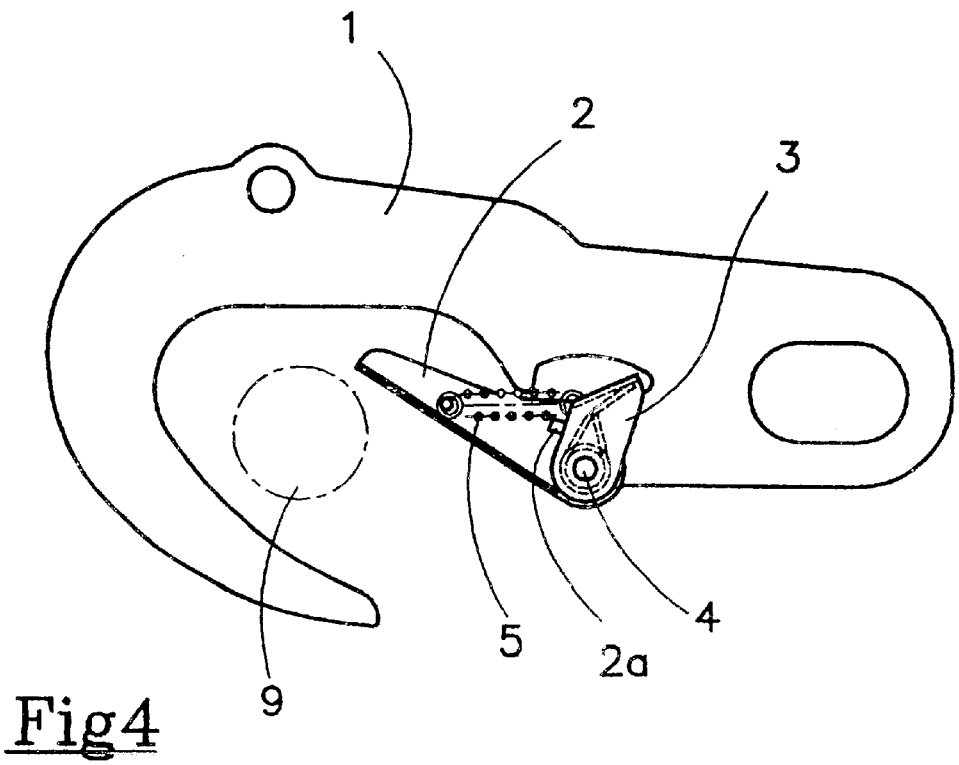
FIG. 4 is a section view C—C of FIG. 2, with the latch in the open position.

The device illustrated in FIGS. 1–5 consists of a hook-shaped body 1 with, at one end an attachment point 1c for a rope 7, and a second attachment point 1b, located approximately opposite the open part of the hook, for a second rope 8 (or a simple ring, not shown). The central part of the body includes a hole perpendicular to the plane of the body, to house a pin 4. A stop 1a is located on the inner face of the body.

The pin 4 serves as a pivot for a latch composed of a lever 2 and a bridge-piece 3. This lever and bridge-piece pivot together on the pin 4. The lever 2 includes a stop 2a which is held against one side of the bridge-piece 3 by a return-spring 5, these three components forming a pivoting ensemble. A second spring 6, placed around the pin 4, pushes the said bridge-piece 3 against the said stop 1a of the body, thus ensuring that the hook is closed by the latch.

In an embodiment of the present snap-hook, the torque exerted by the return-spring 5 between the lever 2 and the bridge-piece 3 is greater than the torque exerted by the second spring 6 between the latch and the stop 1a of the body. The difference in torque can be accomplished by the return-spring 5 having a greater spring force than that of the second spring.

Figure 5:
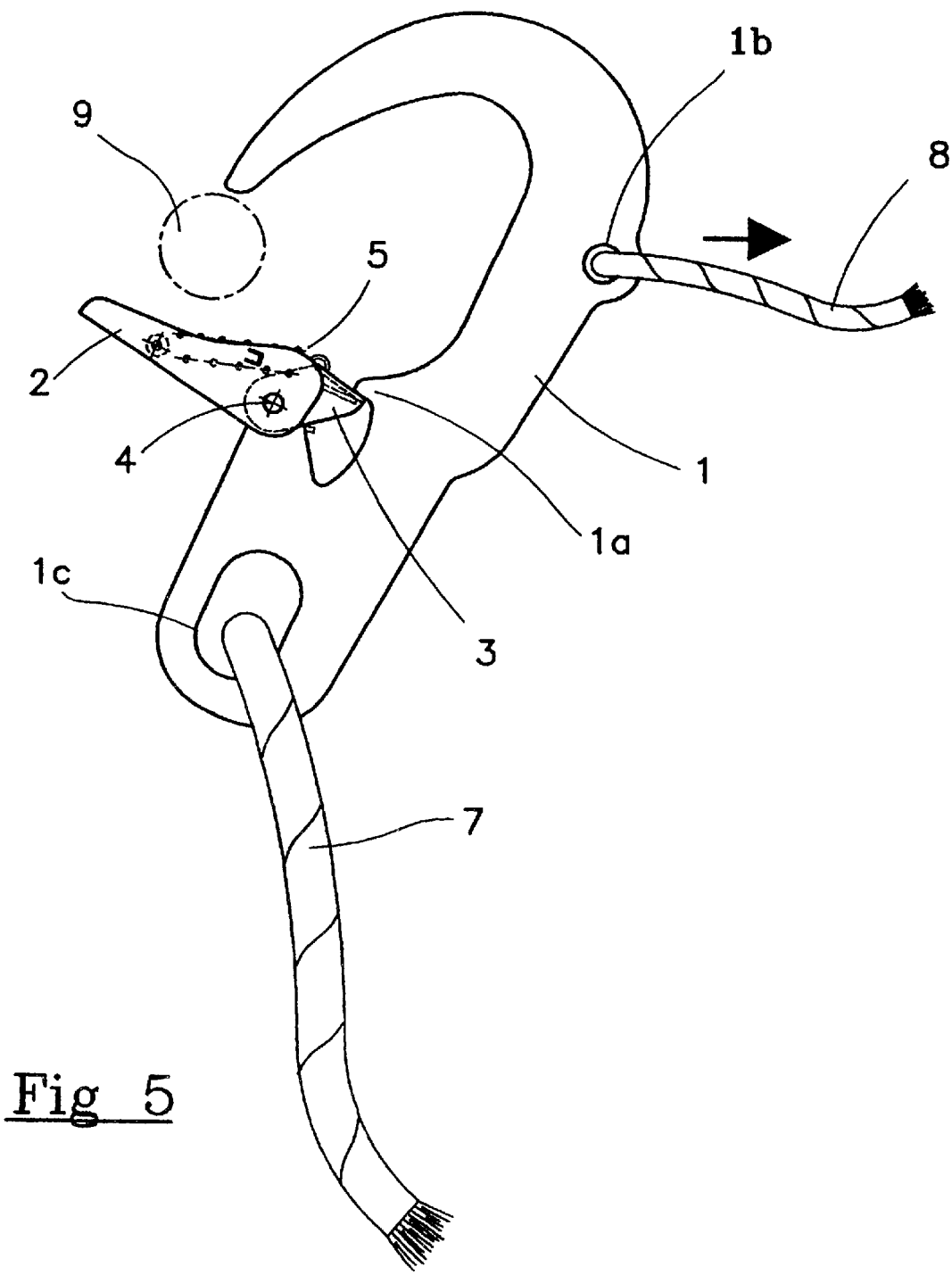
FIG. 5 is a view of the snap-hook in the release position.

To detach the snap-hook from the mooring ring, one must first slacken the boat's mooring rope 7, then pull on the release cord 8 (or some other means, for example a ring fixed to the said attachment point 1b on the body of the hook) so as to cause the snap-hook to take up its release position, as illustrated in FIG. 5. In this position, a continuous pull on the release cord 8 (or other means attached to the attachment point) will draw the ring of the buoy 9 against the interior of the latch, in such a way as to make the said lever pivot, against the force of the return spring 5, towards the exterior of the snap-hook, as shown in FIG. 5. Once the ring of the buoy has been released, the lever resumes its initial position due to the action of the return-spring, thereby closing the snap-hook.

Figure 6:
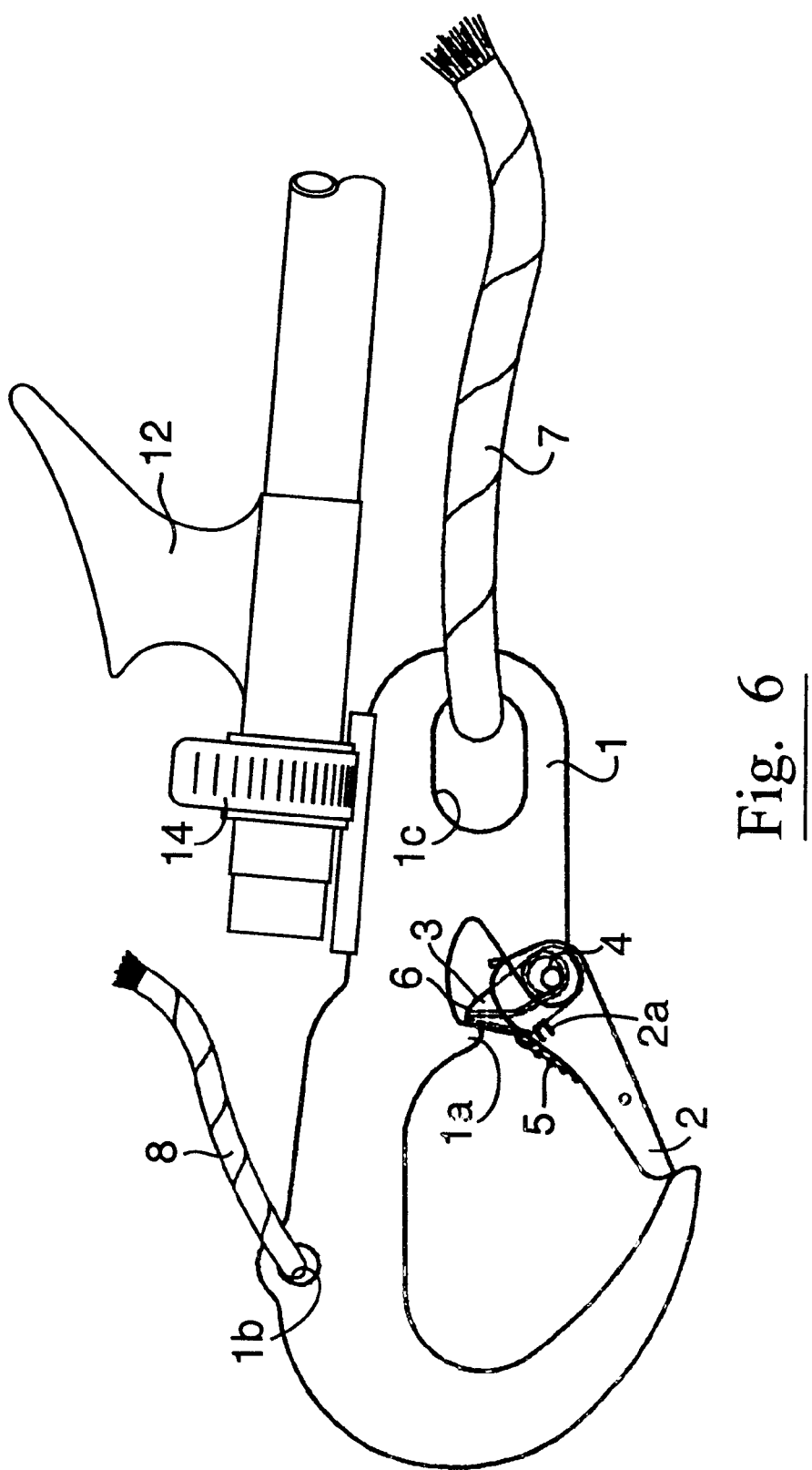
FIG. 6 is a view of the snap-hook attached to a boat-hook.

The mooring procedure is thus carried out using a device similar to a classic snap-hook, whereas the release action results from a rotation of the snap-hook itself, followed by the automatic opening of the latch towards the exterior of the snap-hook. This opening is caused by the force exerted upon the latch by the mooring ring at an angle virtually perpendicular to the pivoting movement of the latch. It is obvious that this snap-hook may be temporarily attached to the end of a handle or boat-hook 12 (see FIG. 6), by appropriate means 14, in order to perform the mooring operation at a greater distance.

Furthermore the device according to this invention is simple, robust, reliable, and comprises few component parts. The hook, made in one piece, is extremely robust in order to resist the tractive forces exerted upon it. The fact that the snap-hook can be attached to a long handle (a boat-hook, for example) facilitates the mooring operation, and the same boat-hook may be used for releasing the device at distance.

Although this invention has been shown and described with respect to the detailed embodiments thereof, it will be understood by those skilled in the art that various changes in form and detail thereof may be made without departing from the spirit and scope of the invention.

What is claimed is:

1. A snap-hook, comprising:
   a hook-shaped body;
   a latch pivotally attached to the hook-shaped body on a latch pin, wherein the latch includes a lever, a bridge-piece, and a lever spring, and one or both of the lever or the bridge-piece include a lever stop to limit relative rotational movement between the lever and the bridge-piece, and the lever spring acts between the lever and the bridge-piece thereby biasing one or both of the lever or the bridge-piece toward the lever stop;
   a latch stop attached to the hook-shaped body to limit pivotal movement of the latch relative to the hook-shaped body; and
   a latch spring for biasing the latch against the latch stop;
      wherein the latch is positionable in a release position where the latch spring biases the bridge-piece in contact with the latch stop and the lever is pivoted away from the hook-shaped body; and
      wherein the latch is positionable in a open position where the bridge-piece is pivoted away from the latch stop and the lever spring biases one or both of the lever and bridge-piece into contact with the lever stop.

2. The snap-hook of claim 1, wherein the lever and the bridge-piece are pivotally mounted on the latch pin.

3. The snap-hook of claim 2, wherein the lever has a U-shaped cross-section and the bridge-piece mounts within the U-shaped cross-section of the lever, and the lever stop includes a tab extending into the rotational path of the bridge-piece.

4. The snap-hook of claim 3, wherein the latch spring has a first spring force and the lever spring has a second spring force and the first spring force is lesser than the spring force.

5. The snap-hook of claim 4 wherein the hook-shaped body comprises:
   a primary attachment aperture located at an end of the hook-shaped body; and
   a secondary attachment aperture located approximately opposite the latch.

6. The snap hook of claim 5, wherein the secondary attachment aperture is located such that a line attached to the secondary attachment aperture, if pulled, will cause an object disposed within the hook-shaped body to contact the lever.

7. The snap-hook of claim 4 wherein the hook-shaped body comprises:
   a primary attachment site located at an end of the hook-shaped body for attaching a rigid or flexible handle to the hook-shaped body; and
   a secondary attachment site located approximately opposite the latch for attaching a rigid or flexible hook-release handle to the hook-shaped body.

8. The snap-hook of claim 7, further comprising a boat-hook attached to the primary attachment site.

9. The snap-hook of claim 1 wherein the lever has a U-shaped cross-section and the bridge-piece mounts within the U-shaped cross-section of the lever, and the lever stop includes a tab extending into the rotational path of the bridge-piece.

10. The snap-hook of claim 1, wherein the latch spring has a first spring force and the lever spring has a second spring force and the first spring force is lesser than the second spring force.

11. A snap-hook, comprising:
    a hook-shaped body;
    a latch pivotally attached to the hook-shaped body;
    a latch spring; and
    a release line aperture disposed in the hook-shaped body, located approximately opposite the latch;
       wherein in a closed position, the latch is maintained in alignment with the hook-shaped body by a latch spring, thereby closing the hook-shaped body; and
       wherein the latch is pivotable out of the closed position, away from the hook-shaped body, into a release position; and
       wherein the latch is pivotable out of the closed position, toward the hook-shaped body, into an open position.

12. The snap hook of claim 11, wherein the release line aperture is located such that a line attached to the release line aperture, if pulled, will cause an object disposed within the hook-shaped body to contact the latch.

13. A snap-book, comprising:
    a hook-shaped body;
    a latch pivotally attached to the hook-shaped body, wherein the latch includes a lever, a bridge-piece, and a lever spring, and the lever spring acts between the lever and the bridge-piece thereby biasing the lever and the bridge-piece toward the one another;
    a latch stop attached to the hook-shaped body to limit pivotal movement of the latch relative to the hook-shaped body; and
    a latch spring for biasing the latch against the latch stop;
       wherein the latch spring has a first spring force and the lever spring has a second spring force and the first spring force is lesser than the second spring force.

* * * * *

UNITED STATES PATENT AND TRADEMARK OFFICE
CERTIFICATE OF CORRECTION

PATENT NO.   : 6,450,558 B1
DATED        : September 17, 2002
INVENTOR(S)  : Anthony Stephen Ringrose It is certified that error appears in the above-identified patent and that said Letters Patent is hereby corrected as shown below:

<u>Column 3,</u>
Line 67, "force and the first spring force is lesser that the spring force" should read -- force and the first spring force is lesser than the second spring force --

Signed and Sealed this

Eighteenth Day of February, 2003

JAMES E. ROGAN
*Director of the United States Patent and Trademark Office*